United States Patent [19]

Burow et al.

[11] Patent Number: 4,911,760
[45] Date of Patent: Mar. 27, 1990

[54] COLOR PURE IRON OXIDE PIGMENTS, A PROCESS FOR THEIR PREPARATION

[75] Inventors: Wilfried Burow; Hans-Ulrich Höfs; Karl-Werner Ganter, all of Krefeld; Gerd-Hermann Schulten, Duisburg, all of Fed. Rep. of Germany

[73] Assignee: Bayer Aktiengesellschaft, Leverkusen-Bayerwerk, Fed. Rep. of Germany

[21] Appl. No.: 189,349

[22] Filed: May 2, 1988

[30] Foreign Application Priority Data

May 15, 1987 [DE] Fed. Rep. of Germany ....... 3716300

[51] Int. Cl.$^4$ ............................ C07C 1/24; C08K 3/22
[52] U.S. Cl. ..................................... 106/459; 106/456
[58] Field of Search ................................ 106/456, 459

[56] References Cited

U.S. PATENT DOCUMENTS

| 4,153,472 | 5/1979 | Pellizzon et al. | 106/456 |
| 4,261,966 | 4/1981 | Portes et al. | 106/459 |
| 4,620,879 | 11/1986 | Burow et al. | 106/456 |
| 4,698,100 | 10/1987 | Burow et al. | 106/456 |
| 4,702,776 | 10/1987 | Hoffner et al. | 106/456 |
| 4,753,680 | 6/1988 | Burow et al. | 106/456 |

FOREIGN PATENT DOCUMENTS 1102505 6/1981 Canada .
3326632 2/1985 Fed. Rep. of Germany .
762102 11/1956 United Kingdom .

OTHER PUBLICATIONS

T. C. Patton: "Pigment Handbook, Properties and Economics", Band 1, 1973, pp. 333, 338, John Wiley & Sons.
Derwent Abstracts, an 75-01128w/01, "Red Iron Oxide Pigment Production", Soviet Union Pat. 418506, 7/30/74.

Primary Examiner—Paul Lieberman
Assistant Examiner—Christine A. Skane
Attorney, Agent, or Firm—Connolly and Hutz

[57] ABSTRACT

Iron oxide red pigments comprise clusters of a plurality of pigment particles, preferably at least five intergrown spherical particles, are prepared by conducting nuclear formation of iron oxide yellow $\alpha$-FeOOH in the presence of compounds of the elements, B, Al, Ga, Si, Ge, Sn or mixtures thereof in quantities of from 0.05 to 10% by weight, calculated as tri- or tetravalent oxides and based on the arithmetically calculated precipitated $\alpha$-FeOOH nuclei, separating brine from the resulting yellow slurry to isolate an iron oxide yellow paste, drying and annealing the paste to form iron oxide red pigment and grinding the red pigment, which pigment is useful in coloring foodstuffs, lacquers, plastics and building materials.

3 Claims, 1 Drawing Sheet

COLOR PURE IRON OXIDE PIGMENTS, A PROCESS FOR THEIR PREPARATION

The present invention relates to new iron oxide red pigments which are pure in color and low in foreign metals, to a process for their preparation and to their use.

BACKGROUND OF THE INVENTION

Four processes (T. C. Patton, Pigment Handbood, Volume 1, New York 1973, page 333) are generally employed for the preparation of red iron oxide pigments but no simple, economical and at the same time environmentally safe method has yet been found for the production of iron oxide red pigments which are pure in color and low in foreign metal content.

It is an object of the present invention to provide improved iron oxide red pigments which are economically obtainable by a technically simple process.

BRIEF DESCRIPTION OF THE INVENTION

It has now suprisingly been found that these requirements are fulfilled by novel iron oxide red pigments which are not needle shaped, as would be expected, but in the form of clusters. Thus, the present invention relates to iron oxide red pigments which are characterized in that they consist of pigment particles in the form of clusters.

DETAILED DESCRIPTION OF THE INVENTION

Figure 1:
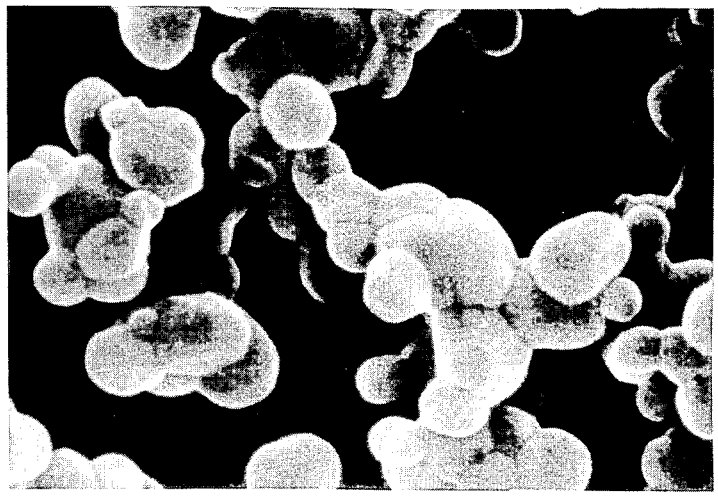
FIGS. 1 and 2 are photomicrographs of pigments according to this invention.

The pigments according to this invention differ from conventional iron oxide red pigments in their cluster form and are surprisingly pure in color and low in traces of foreign elements.

The iron oxide red pigments according to this invention are obtainable by annealing highly branched, needle shaped iron oxide yellow pigments.

Particularly preferred are those iron oxide red pigments in which the clusters of pigment particles consist of at least five intergrown spherical particles. The amount of As, Pb, and Ba present as foreign metal content in the iron oxide red pigments according to this invention is preferably less than 5 ppm. The total amount of Cu, $BaSO_4$, Zn, Sb and Cr contained in them is preferably less than 200 ppm.

Those iron oxide yellow pastes, which have hitherto been regarded as unsuitable for the preparation of color pure iron oxide red pigments because they contain unsaturated iron oxide yellow pigments which are impure in color may now be used as suitable starting materials for the preparation of the iron oxide red pigments according to this invention.

The iron oxide yellow pastes used as starting material may be prepared according to German 3,326,632 and contain needle shaped, highly branched pigment particles. These starting material may be prepared by any conventional methods employed for the production of iron oxide yellow.

A preferred process for the preparation of the iron oxide red pigments according to this invention is characterized in that the formation of nuclei of iron oxide yellow ($\alpha$-FeOOH) is carried out in the presence of compounds of the elements B, Al, Ga, Si, Ge and/or Sn in quantities of from 0.05 to 10% by weight, calculated as trivalent or tetravalent oxides and based on the arithmetically calculated quantity of precipitated $\alpha$-FeOOH nuclei, and the step of pigment formation is carried out in the usual manner and the brine liquid is separated from the yellow sludge formed in this step. The isolated iron oxide yellow paste is then annealed to form the iron oxide red pigment and ground. In this process, a nucleus with degrees of precipitation of from 20 to 70% is first prepared according to German 3,326,632 in the presence of compounds of the elements B, Al, Ga, Si, Ge or Sn at temperatures from room temperatures to 70° C. A pigment is then left to grow on this nucleus. Pigments formation may be carried out in the presence of metallic iron by the method of Penniman, or by an aniline process or precipitation process, in which iron salts which have been purified by preprecipitation may be used.

In the precipitation process, pigment formation may take place at a constant pH in the range of from 2.8 to 4.5 or with stepwise raising of the pH during pigment formation by 0.1 to 0.2 units per hour from values below 3 to values of 3.8 to 4.5.

Pigment formation results in the formation of salt-containing yellow pigment slurries which may be used as starting materials which can be worked up into the novel iron oxide red pigments by a particularly simple, economical and envirnment friendly process.

First, the salt is separated from the slurries which contain about 30 to 70 g/l of iron oxide yellow solid needles and a brine. The brine may first be separated from the highly branched, needle shaped starting material by sedimentation since the highly branched yellow pigment is capable of sedimenting 20 times more quickly than conventional iron oxide yellow such as, for example, Bayferrox® 920 (trade product of Bayer AG). The supernatant brine may be pumped off after sedimentation time of 3 hours.

A yellow paste is left behind in the sedimentation vessel. This paste is thickened by sedimentation to an iron oxide yellow content of more than 200 g/l. If then still contains a residue of salt which is washed out during the subsequent filtration. The iron oxide yellow paste is dewatered to a solids content of more than 50% by weight by the subsequent filtration in a rotary filter followed by washing.

The filter residue is low in salt (salt content $<0.5\%$ by weight) and is fluid and can be pumped and through it has a solids content of more than 50% by weight, it may advantageously be sprayed in a spray dryer and dried.

The processing characteristics of the filter residue differ fundamentally from those of conventional yellow pastes such as, for example, Bayferrox® 920, which can only be dehydrated to a solids content of about 30% by weight when filtered to form fluid pastes which can be pumped. If the solid contents are higher, the viscosity of these yellow pastes increases to such an extent that the highly viscous filter residues can no longer be processed and spray drying is impossible.

For conventional yellow pastes having a solids content of about 30% by weight, more than two tons of water must be evaporated for each tone of pigment during the subsequent drying or the subsequent calcination to iron oxide red, and the consumption of natural gas in the dryer or the annealing oven is correspondingly high. The yellow pastes used according to this invention, which may have solids contents of e.g. 50 to 55% by weight, require the evaporation of at the most one ton of water per ton of pigment. The lower consumption in natural gas required for this evaporation results in a considerable saving in cost. A particularly preferred embodiment of the process according to the invention consists in that th iron oxide yellow pastes which are dried or annealed have a solids content of at least 50% by weight when charged into the drying or annealing apparatus.

If the dried yellow starting material is temporarily stored before it is annealed to form iron oxide red, its high bulk weight is found to be an advantage. Since the starting material has a bulk weight of 0.7 g/ml instead of the 0.33 g/ml of conventional iron oxide yellow (Bayferrox® 920), only about 150 m$^3$ of silage space is requird for storing 100 tons of starting material instead of over 300 m$^3$.

In the process of annealing of the starting material, the color characteristics of the iron oxide red pigment obtained are influenced in known manner by the particle size of the starting material, the temperature and the residence time. Typical temperatures are 500°–1000° C., preferred are 650°–900° C., typical residence times are 5–60 minutes, preferred are 15–30 minutes.

The red clinker obtained as product from the furnace is ground in a grinding apparatus by the usual technical method. Those skilled in the art have a wide choice of different grinding apparatus available, such as Raymond mills, pearl mills and air jet or stream jet mills, but these are only mentioned as examples here and are in no way limiting.

It is surprisingly found that the iron oxide red pigments obtained after calcination and grinding have a novel particle form. The new iron oxide pigments contain pigment particles in the form of clusters which distinguishes them clearly from conventional iron oxide pigments. By virtue of this particle form, the new iron oxide red pigments are exceptionally pure in color and are low in trace metal content.

A cluster generally consists of 5 to 15 spheres or sphere-like particles which are intergrown.

Figure 2:
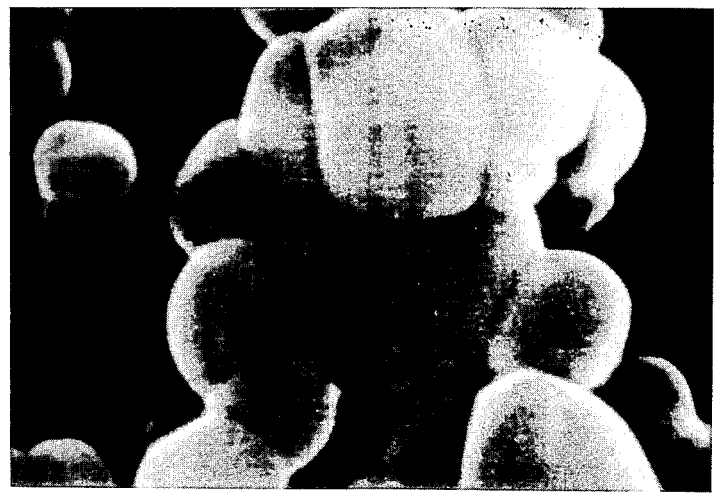

FIG. 1 and FIG. 2 are electron microscopic photographs of iron oxide red pigments according to this invention in 60,000 times and 120,000 times magnification, respectively.

By virtue of their color purity and low trace element content, the novel iron oxide red pigments are very suitable as environmentally safe iron oxide red pigments, for coloring lacquer systems, dispersions, plastics and building materials as well as for coloring foodstuffs.

The present invention thus also relates to the use of the environmentally compatible iron oxide red pigments according to this invention in the lacquer, plastics and building material industries and in foodstuffs. The invention will now be described with the aid of examples but these examples in no way limit the invention.

EXAMPLE 1

342 g of Al$_2$(SO$_4$)$_2 \times$18H$_2$O were dissolved in 15.19 liters of FeSO$_4$ solution (c=200 g FeSO$_4$/l) in a refined steel vessel. The solution obtained was heated to 55° C. in about 20 minutes and 2,200 ml of NaOH solution (c=9.9 mol/l) were added and the reaction mixture was stirred and oxidized with 400 liters of air per hour until the pH was ≦3.8.

7.0 liters of water were added to 3.0 liters of the resulting yellow nuclear suspension and the mixture was heated to 80° C. 5,700 ml of NaOH solution (c=4.7 mol/l) and 9,100 ml of FeSO$_4$ solution (c=200 g FeSO$_4$/l) were then added at such a rate over a period of 15 hours at 80° C. with stirring and gasification with 1,000 liters of air per hour that the pH in the suspension remained constant at 3.9±0.2.

The product obtained as starting material was washed free from salt. The yellow paste was then dried to a residual moisture content of les than 2% in a drying cupboard. Samples of the dried starting material were then dehydrated by annealing in a laboratory furnace. The following tables show the annealing temperatures of the samples.

The furnace clinker resulting from the annealing process was ground in a micro dismembrator with a steel ball for 60 seconds.

EXAMPLE 2

206 ml of sodium aluminate solution (c=3.0 mol Al$_2$O$_3$/l+9.05 mol NaOH/l) and 1793 ml of NaOH solution (c=9.0 mol/l) were added to 15.19 liters of FeSO$_4$ solution (c=200 g FeSO$_4$/l) at 50° C. in a refined steel vessel, and the reaction mixture was oxidized with 500 liters of air per hour at 50°–55° C. with stirring until the pH was ≦3.8. 3.0 liters of this yellow nuclear suspension were diluted to 10 liters with water and heated to 80° C. After heating, the pH fell to ≦3.0. 4.08 liters of NaOH solution (c=5.0 mol/l) and about 6.40 liters of FeSO$_4$ solution (c=200 g FeSO$_4$/l) were then added at such a rate over a period of 12 hours at 80° C. with stirring and gasification with 1,000 liters of air per hour that the pH in the suspension first rose by 0.1 to 0.2 units per hour up to pH=4.0 and then remained constant at 4.0±0.1.

The starting material obtained was washed free from salt and the yellow paste was then dried to a residual moisture content of <2% in the drying cupboard. Samples of the dried material were then annealed in a laboratory furnace to dehydrate the starting material. Data for the annealing temperatures used for the samples are given in the followingg tables.

The furnace clinker obtained by annealing was ground in a micro dismembrator for 60 seconds with a steel ball.

EXAMPLE 3

1030 ml of AlCl$_3$ solution (c=1.20 mol AlCl$_3$/l) were added to 15.19 liters of FeSO$_4$ solution (c=200 g FeSO$_4$/l) in a refined steel vessel. After the solution had been heated to 50° C., 2546 ml of NaOH solution (c=9.0 mol/l) were added and the reaction mixture was then oxidized with 500 liters of air per hour at 50°–55° C. with stirring until the pH was ≦3.8. 10.5 liters of water were added to 4.5 liters of this yellow nuclear suspension and the mixture was heated to 80° C. 2,765 ml of NaOH solution (c=5.0 mol/l) and 3060 ml of FeSO$_4$ solution (c=225 g FeSO$_4$/l) were added at such a rate at 80° C. with stirring and gasification with 800 liters of air per hour that the suspension reached a pH of 4.0±0.2 after 16 hours. The resulting starting material was washed free from salt and the yellow paste was then dried to a residual moisture content of <2% in the drying cupboard. Samples of the dried material were then annealed in a laboratory furnace to dehydrate the starting material. Data concerning the annealing temperatures of the samples are given in the following tables.

The furnace clinker obtained by annealing was ground in a micro dismembrator for 60 seconds with a steel ball.

EXAMPLE 4

62.0 m³ of commercial FeSO₄ solution¹⁾ (c=201.0 g FeSO₄/l) and 2215 liters of commercial Al₂(SO₄)₃ solution (c=1.00 mol/l) were heated to 30° C. with stirring. After the solutions had been heated up, 9.40 m³ of commercial sodium hydroxide solution (c=9.50 mol/l) were pumped in and the temperature was at the same time raised to 45° C. with stirring and oxidation with 700 m³ of air per hour until the pH was ≦3.8.

80.0 m³ of water were added to 36.0 m³ of this yellow nuclear suspension and the mixture was heated to 75° C. After the mixture had been heated up, the pH fell to ≦3.0. 26.0 m³ of commercial sodium hydroxide solution (c=5.00 mol/l) and 37.0 m³ of commercial FeSO₄ solution¹⁾ (c=201.0 g FeSO₄/l) were then added at such a rate over a period of about 16 hours at 75° C. with stirring and gasification with 700 m³ of air per hour that the pH in the suspension first rose by 0.1 to 0.2 units per hour to pH 3.8 and then remained constant at 4.0±0.2.

¹⁾Preparation of iron sulphate heptahydrate, by-product of the preparation of titanium dioxide by the so-called sulphate process.

The pigment suspension was washed free from salt and filtered over a rotary vacuum filter and the filter paste was annealed in a rotary tubular kiln. The furnace clinker obtained was ground in a steam jet mill.

Table 1 contains the trace content of an iron oxide red pigment prepared according to this invention compared with that of conventional pigments. Table 1 shows that pigments prepared according to this invention are superior to conventional iron oxide red pigments in purity, especially in their very low As, Pb and Ba contents, and are very low in trace elements.

Table 2 compares the color values of iron oxide red pigments prepared according to this invention (examples 2 and 3) with the color values of conventional iron oxide red pigments. The iron oxide red pigment prepared according to the invention is distinguished by its exceptionally high color purity, expressed by the red content a*, and the high color saturation c*, compared with those of rival products. The color values of the pigments were determined in the lacquer, Alkydal ®F 48 (trade product of Bayer AG) at 10% pigment volume concentration according to DIN 6174 (equivalent ISO/DIN 7742, 1-3 drafts) CIELAB c/2 degrees.

TABLE 1

| | Trace content red pigments | | | | | | |
|---|---|---|---|---|---|---|---|
| Product | As | Pb | BaSO₄ | Sb | Ba | Hg | Se |
| Coppera Red$^a$ | <5¹ | 1–15¹ | ./. | 5–15¹ | 10–100¹ | <0.1¹ | <20¹ |
| Precipitated Red$^a$ | 30–60¹ | 10–40¹ | ./. | 5–20¹ | 30–120¹ | <0.1¹ | <20¹ |
| Example 1$^b$ | <5 | <5 | <5 | <5 | <1 | <1 | <5 |

All figures in ppm
$^a$Trade products of Pfizer Inc.
$^b$Total content of Cu, BaSO₄, Zn, Sb, Cr: 130 ppm
¹Industrial Minerals and Rocks, Hancock, 1975, New York, Page 335, Table 8.

TABLE 2

Color intervals of Iron Oxide pigments according to DIN 6174, CIELAB C/2 degrees.

| | | | Color Intervals | | | | |
|---|---|---|---|---|---|---|---|
| Example | Annealing Temperature | Reference | H degr. | C* | L* | a* | b* |
| 1 | 775° C. | Pfizer RO 3097 | 0.1 | 0.6 | 0.7 | 0.4 | 0.4 |
| 2 | 775° C. | Pfizer R 1299 | 0.1 | 0.6 | −0.2 | 0.5 | 0.2 |
| 2 | 800° C. | Pfizer R 2199 | 0.3 | 1.1 | 0.2 | 0.7 | 0.8 |
| 2 | 825° C. | Pfizer R 3097 | 1.3 | 1.9 | 1.4 | 1.1 | 1.7 |
| 3 | 800° C. | Pfizer R 1299 | 1.3 | 0.9 | 0.8 | 0.2 | 1.1 |
| 3 | 825° C. | Pfizer R 1299 | 0 | 0.8 | 0.1 | 0.7 | 0.3 |
| 4 | 800° C. | Pfizer R 1299 | 0.2 | 0.5 | 0 | 0.4 | 0.2 |

What is claimed is:

1. Process for the preparation of iron oxide red pigments which comprise clusters of a plurality of individual pigment particles, wherein the clusters of pigment particles comprise at least five intergrown spherical particles, which comprises conducting nuclear formation of iron oxide yellow α-FeOOH in the presence of compounds of the elements, B, Al, Ga, Si, Ge, Sn or mixtures thereof in quantities of from 0.05 to 10% by weight, calculated as tri- or tetravalent oxides and based on the arithmetically calculated precipitated α-FeOOH nuclei, separating brine from the resulting yellow slurry to isolate an iron oxide yellow paste, drying and annealing the paste at 500°–1000° C. for 5–60 minutes to form iron oxide red pigment and grinding the red pigment.

2. Process according to claim 1 wherein the separation of brine is by sedimentation.

3. Process according to claim 1 wherein the iron oxide yellow paste has a solids content of at least 50% by weight when subjected to the drying and annealing step.

* * * * *